(12) United States Patent
Leufen

(10) Patent No.: US 7,809,495 B2
(45) Date of Patent: Oct. 5, 2010

(54) PORTABLE HAND-HELD POWER TOOL HAVING A DATA CONNECTION FOR DIAGNOSTIC PURPOSES

(75) Inventor: Heinrich Leufen, Schwaikheim (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 678 days.

(21) Appl. No.: 11/836,851

(22) Filed: Aug. 10, 2007

(65) Prior Publication Data

US 2008/0041146 A1 Feb. 21, 2008

(30) Foreign Application Priority Data

Aug. 16, 2006 (DE) ........................ 10 2006 038 278

(51) Int. Cl.
*G06F 19/00* (2006.01)
*G01M 15/04* (2006.01)
*B25F 5/00* (2006.01)

(52) U.S. Cl. .......................... 701/115; 700/180
(58) Field of Classification Search ................. 701/115, 701/101, 102; 700/168, 180
See application file for complete search history.

(56) References Cited

U.S. PATENT DOCUMENTS

| 6,390,205 B2 * | 5/2002 | Wallgren et al. ................ 173/2 |
| 7,171,942 B2 * | 2/2007 | Nickel ......................... 123/335 |
| 7,346,422 B2 * | 3/2008 | Tsuchiya et al. ............. 700/168 |
| 7,366,584 B2 * | 4/2008 | Brodin et al. ................ 700/168 |
| 7,552,714 B2 * | 6/2009 | Maier et al. ............. 123/406.58 |

* cited by examiner

*Primary Examiner*—Hieu T Vo
(74) *Attorney, Agent, or Firm*—Gudrun E Huckett

(57) ABSTRACT

A power tool has a drive unit arranged in a tool housing. The drive unit has an internal combustion engine with a cylinder provided with a combustion chamber. A spark plug is arranged at the cylinder. A piston is connected to a crankshaft and reciprocates within the cylinder and delimits the combustion chamber. A central control unit controls the drive unit and has a microprocessor and an ignition control unit, wherein the central control unit is connected by the ignition control unit to the spark plug and triggers a spark at the spark plug as a function of a rotary speed of the crankshaft at an appropriate ignition timing. A data storage device is connected to the central control unit. An energy supply unit provides electric energy. An interface enables, from outside the tool housing, external data access to data of the central control unit.

26 Claims, 7 Drawing Sheets

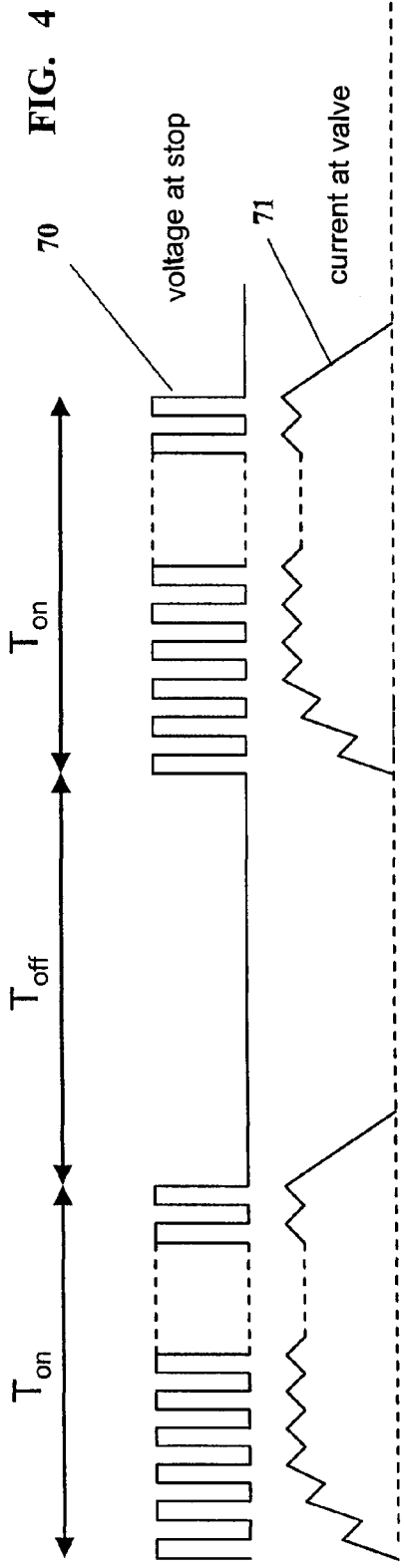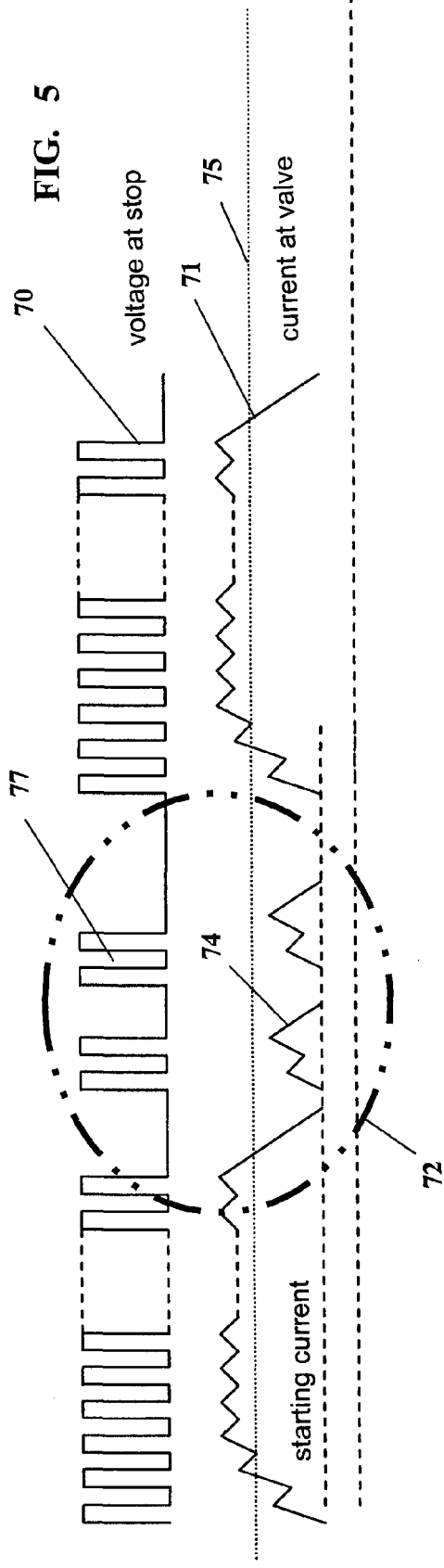

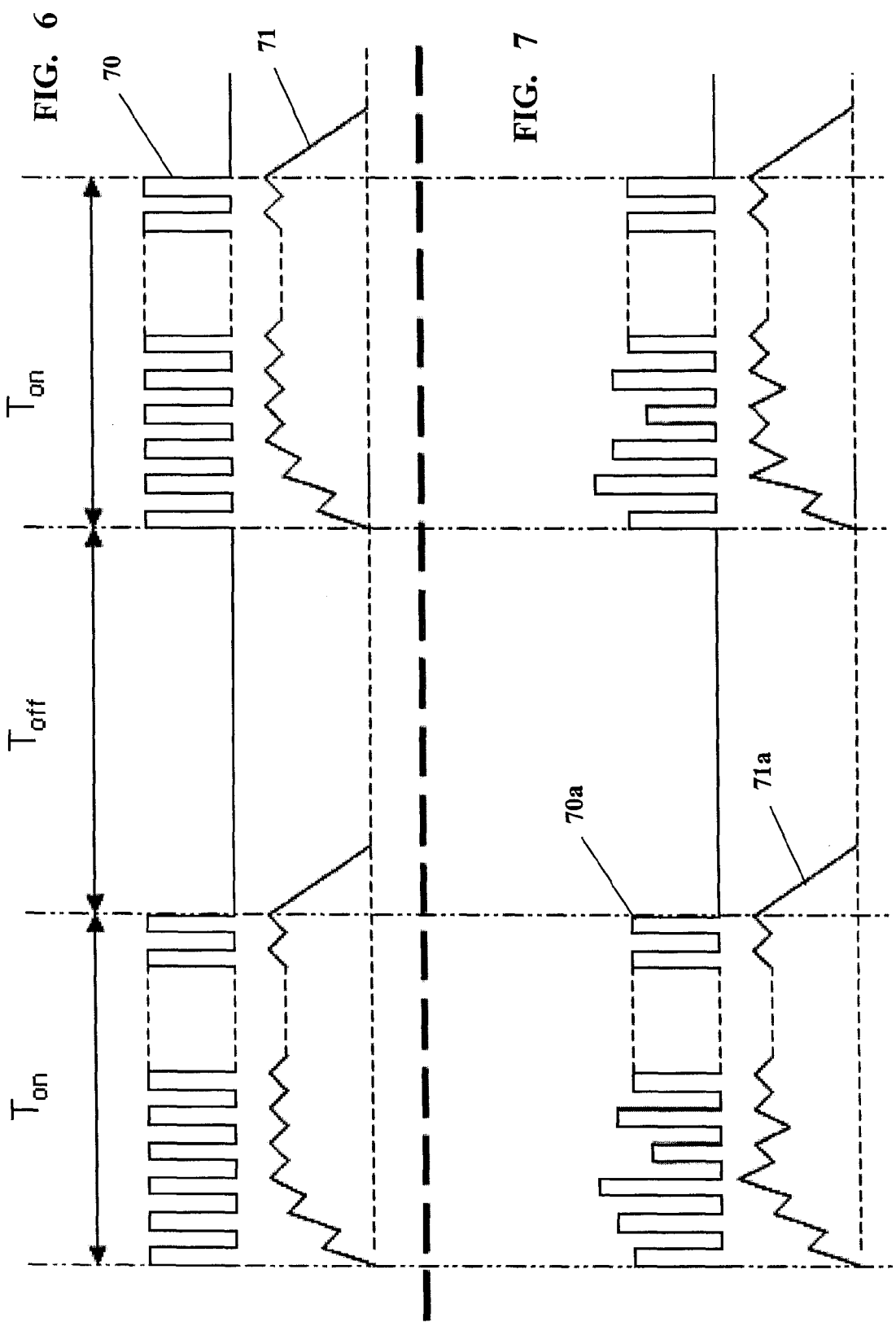

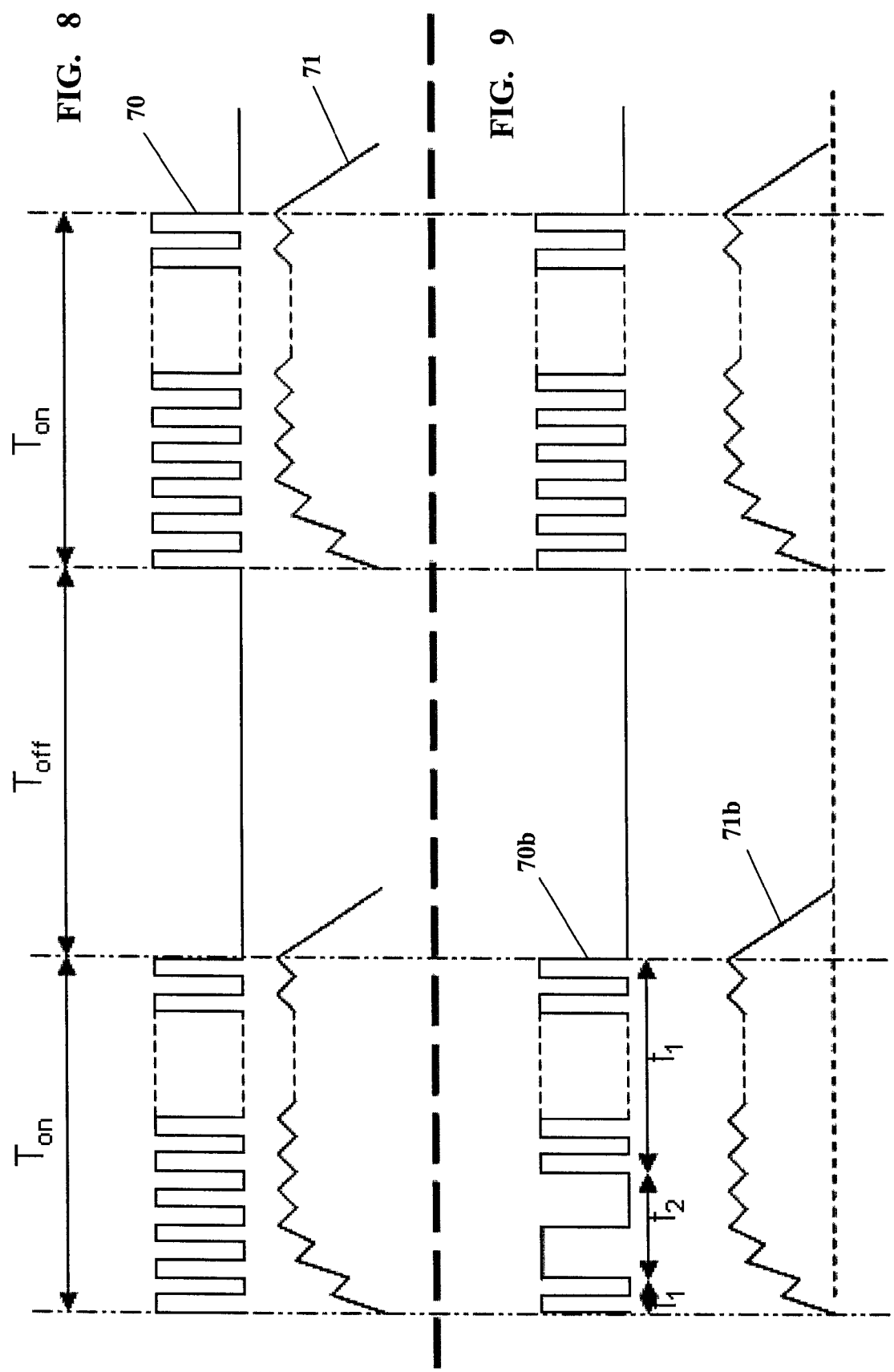

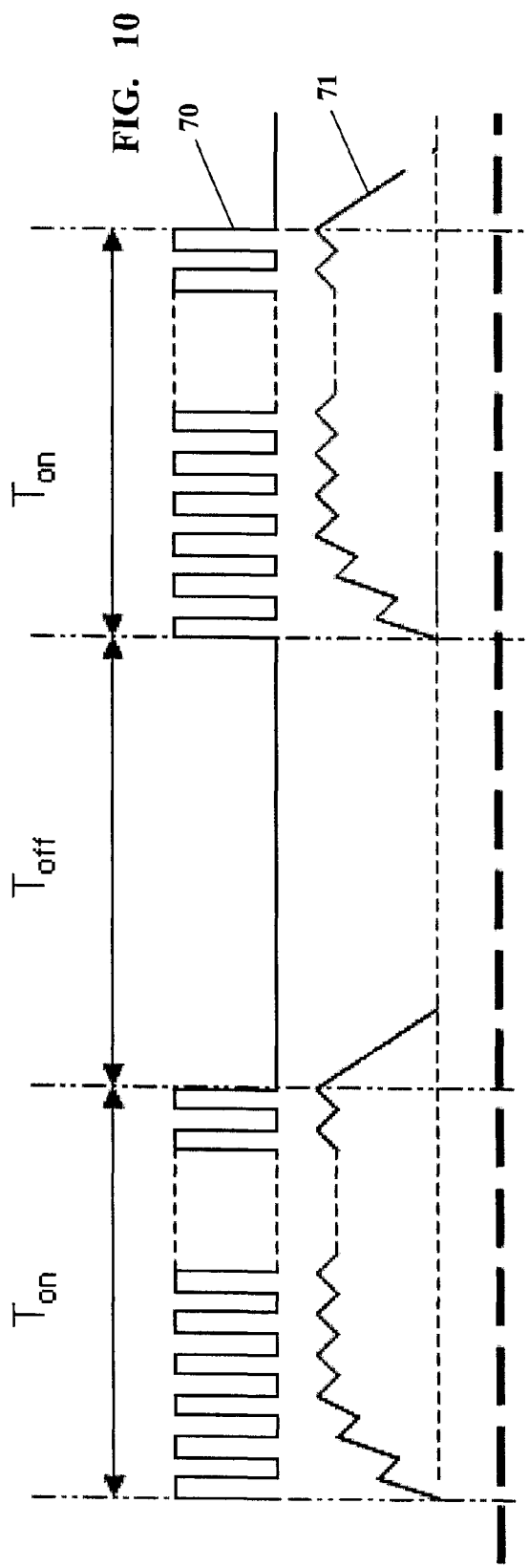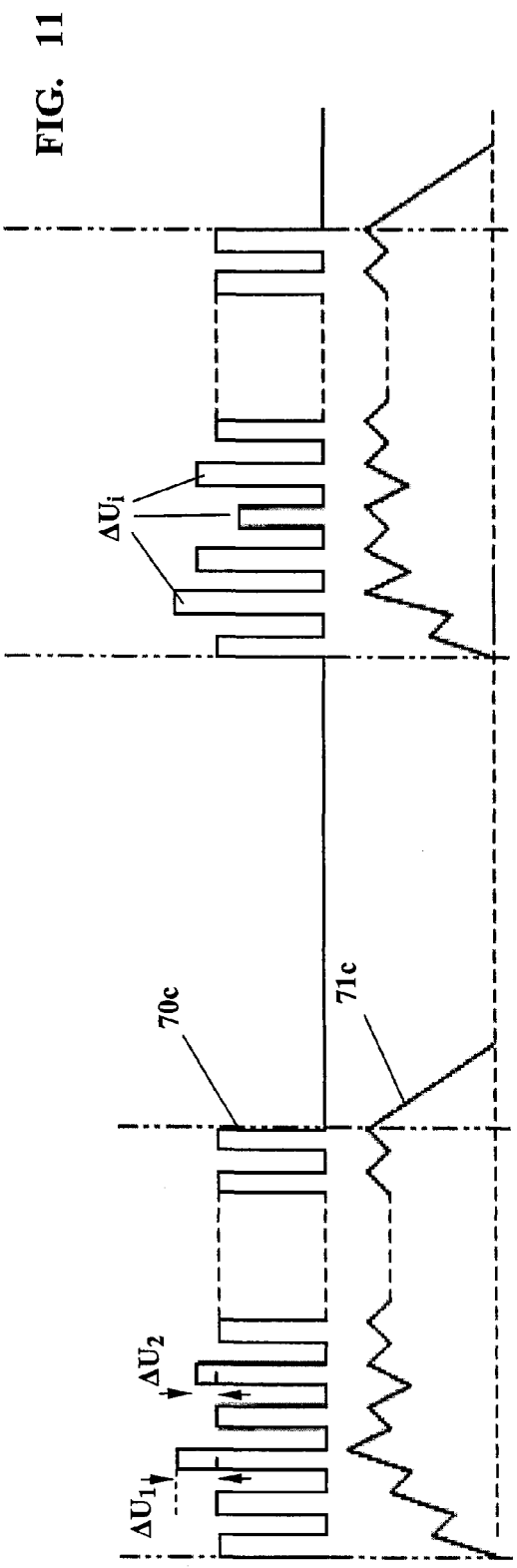

PORTABLE HAND-HELD POWER TOOL HAVING A DATA CONNECTION FOR DIAGNOSTIC PURPOSES

BACKGROUND OF THE INVENTION

The invention relates to a hand-held power tool, in particular a portable hand-held power tool such as a motor chain saw, a cut-off machine, a trimmer, a blower or the like. The power tool comprises a drive unit arranged in a tool housing. The drive unit has an internal combustion engine with a cylinder provided with a combustion chamber and a spark plug. The combustion chamber is delimited by a piston driving the crankshaft. A central control unit controlling the drive unit is provided which central control unit comprises a microprocessor and is connected to the spark plug via an ignition control unit. As a function of the rotary speed of the crankshaft, the central control unit triggers a spark at the spark plug at an adjusted ignition timing. A data storage device is connected to the central control unit and an energy supply device for providing the required electric energy is provided.

Such portable hand-held power tools are generally known. In the interior of the tool housing a drive unit comprising an internal combustion engine is provided. The internal combustion engine has a cylinder with a combustion chamber and a spark plug. The combustion chamber is delimited by a piston that drives the crankshaft in a crankcase. The combustion chamber has moreover a spark plug that provides a spark by means of an ignition unit as a function of the rotary speed and rotary position of the crankshaft at a suitable ignition timing in order to ignite the taken-in fuel/air mixture in the combustion chamber. For this purpose, the drive unit has correlated therewith an electronic central control unit with a microprocessor that is utilized, for example, for calculating the ignition timing and that has connected thereto a data storage device for its operation. The microprocessor can also fulfill other tasks and/or can control other devices such as an injection valve and/or can read sensor values. The required energy for operating the central control unit and for generating the spark or for powering other consumers is provided by an energy supply unit that can be in the form of a generator driven by the crankshaft and delivering at least one voltage wave for each crankshaft rotation.

SUMMARY OF THE INVENTION

The invention has the object to further develop a power tool of the aforementioned kind such that a service technician can access in a simple way operating data of the internal combustion engine and, preferably, can also modify them.

In accordance with the present invention, this is achieved in that by means of an interface access to the central control unit is possible from the exterior of the tool housing. In this connection, the interface is advantageously designed to be bidirectional so that data not only are retrievable but data can also be written into the control unit. It is therefore possible for the operator to actively interact, for example, during service, with the ignition unit in order to adjust e.g. the ignition timing, to update software, or to force certain operating conditions for the purpose of error analysis.

The present data storage device can be used for writing and reading data, for example, the machine ID number, date of purchase, seller, operating hours, service data, wherein the data are accessible without opening the tool housing.

Advantageously, operating data obtained in operation of the internal combustion engine are supplied to the data storage device and saved therein, wherein the data in the data storage device can be saved permanently in the powerless state (nonvolatile memory). The data that are obtained within the tool housing during operation are saved in the data storage device and can be retrieved via the interface at any time from outside the tool housing.

According to the invention, for retrieving the data no excessive constructive measures are required for the interface because as an interface for transporting data from and/or into the data storage device a component is used that is required for operation of the drive unit and is positioned within the tool housing. It is therefore not necessary to perform within the tool housing any constructive changes. The acquisition and saving of additional data such as operating parameters in the data storage device is done by means of software.

Advantageously, an existing electric line of the drive unit is used as an interface, for example, the short-circuit line, for data traffic with the ignition unit and/or the data storage device within the tool housing. The connection with the short-circuit line can be realized by means of a mechanical contact provided in the wall of the tool housing, preferably by means of a plug contact. The access is expediently realized by means of a sender/receiver arranged outside of the tool housing. The plug contact can be provided with a protective cap in order to prevent accidental contacting or soiling.

In a further embodiment of the invention, it is provided to couple the receiver outside of the tool housing without mechanical contact to the interface, for example, by means of an alternating electromagnetic field. Particularly suitable for this purpose is the induction coil of the generator; in this connection, only a corresponding sending/receiving coil must be positioned outside of the tool housing in the vicinity of the induction coil so that the alternating electromagnetic field can penetrate the sending/receiving coil as well as the induction coil. By means of the induction coil it is possible at the same time to provide an energy supply when the engine is shut off so that the motor electronics can be supplied with the required energy for operation from the exterior.

Because in accordance with the invention interfaces are used that are comprised of only one electric line with usually only one lead, the transmission technology employed in the present invention is preferably based on known bus technology.

BRIEF DESCRIPTION OF THE DRAWING

FIG. 4 is a schematic illustration of a signal sequence at the electric stop connector of a power tool with consumer being switched on.

FIG. 5 is a schematic illustration of a signal sequence at the electric stop connector of a power tool with switched-off consumer and with data transmission.

FIG. 6 is a schematic illustration of a signal sequence of the electric stop connector of a power tool with switched-on consumer.

FIG. 7 is a schematic illustration of an amplitude-modulated signal sequence at the electric stop connector of a power tool with switched-on consumer and data transmission.

FIG. 8 is a schematic illustration of a signal sequence at the electric stop connector of a power tool with switched-on consumer.

FIG. 9 is a schematic illustration of a frequency-modulated signal sequence at the electric stop connector of a power tool with switched-on consumer and data transmission.

FIG. 10 is a schematic illustration of a signal sequence at the electric stop connector of a power tool with switched-on consumer.

FIG. 11 is a schematic illustration of a signal sequence with voltage imprinted from the exterior at the electric stop connector of a power tool with switched-on consumer and data transmission.

DESCRIPTION OF THE PREFERRED EMBODIMENTS

Figure 1:
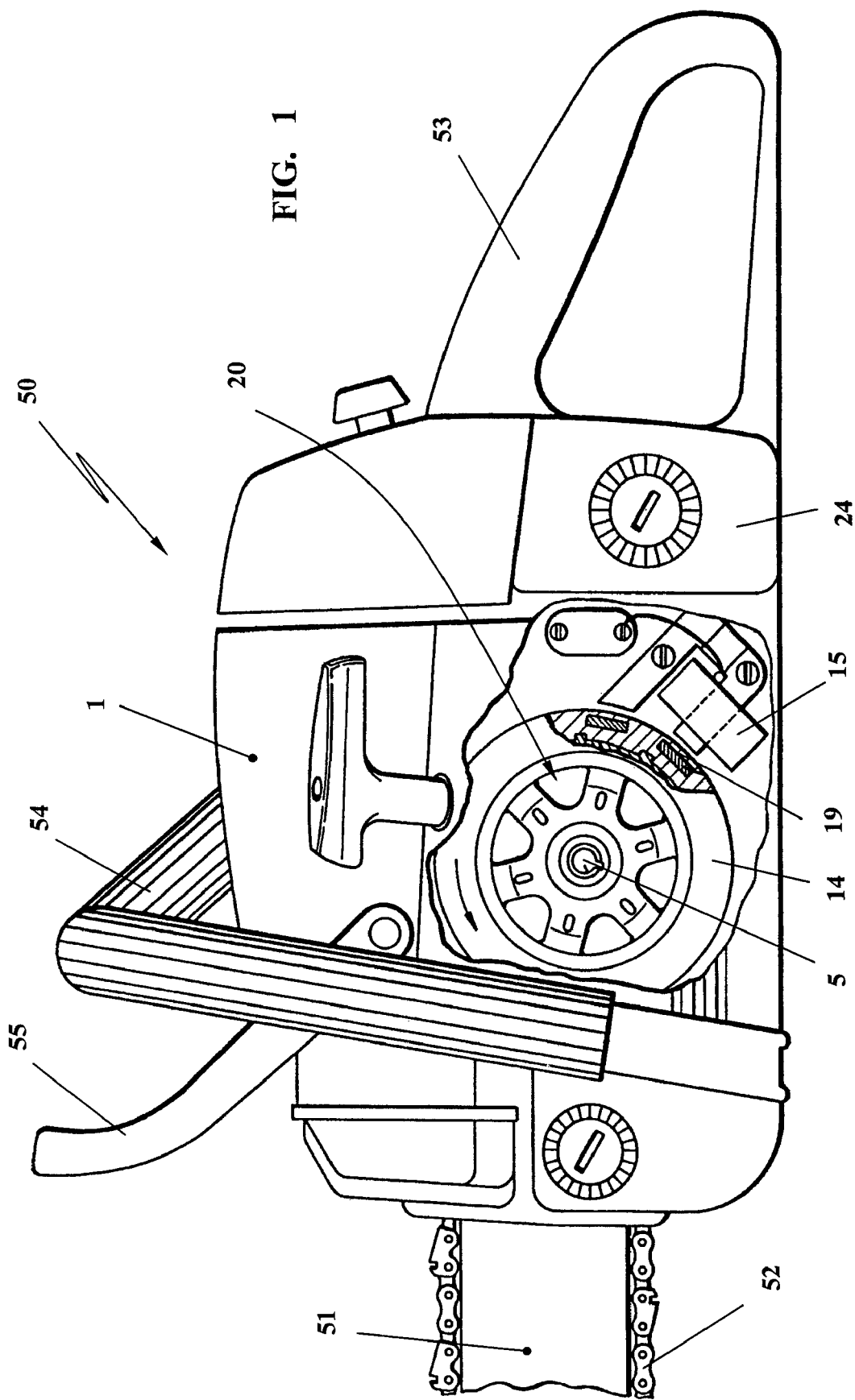
FIG. 1 shows in a schematic view a portable hand-held power tool exemplified as a motor chain saw.

The hand-held power tool illustrated in FIG. 1 is a portable hand-held power tool that is embodied in an exemplary fashion as a chain saw 50. Similar portable hand-held power tools are cut-off machines, blowers, trimmers or the like.

In the tool housing 1 of the power tool a drive unit 20 for driving the tool, in the embodiment a saw chain 52 circulating on a guidebar 51, is provided. The tool housing 1 has a rear handle 53 as well as a front handle 54 having correlated therewith a trigger 55 for a safety device.

Figure 2:
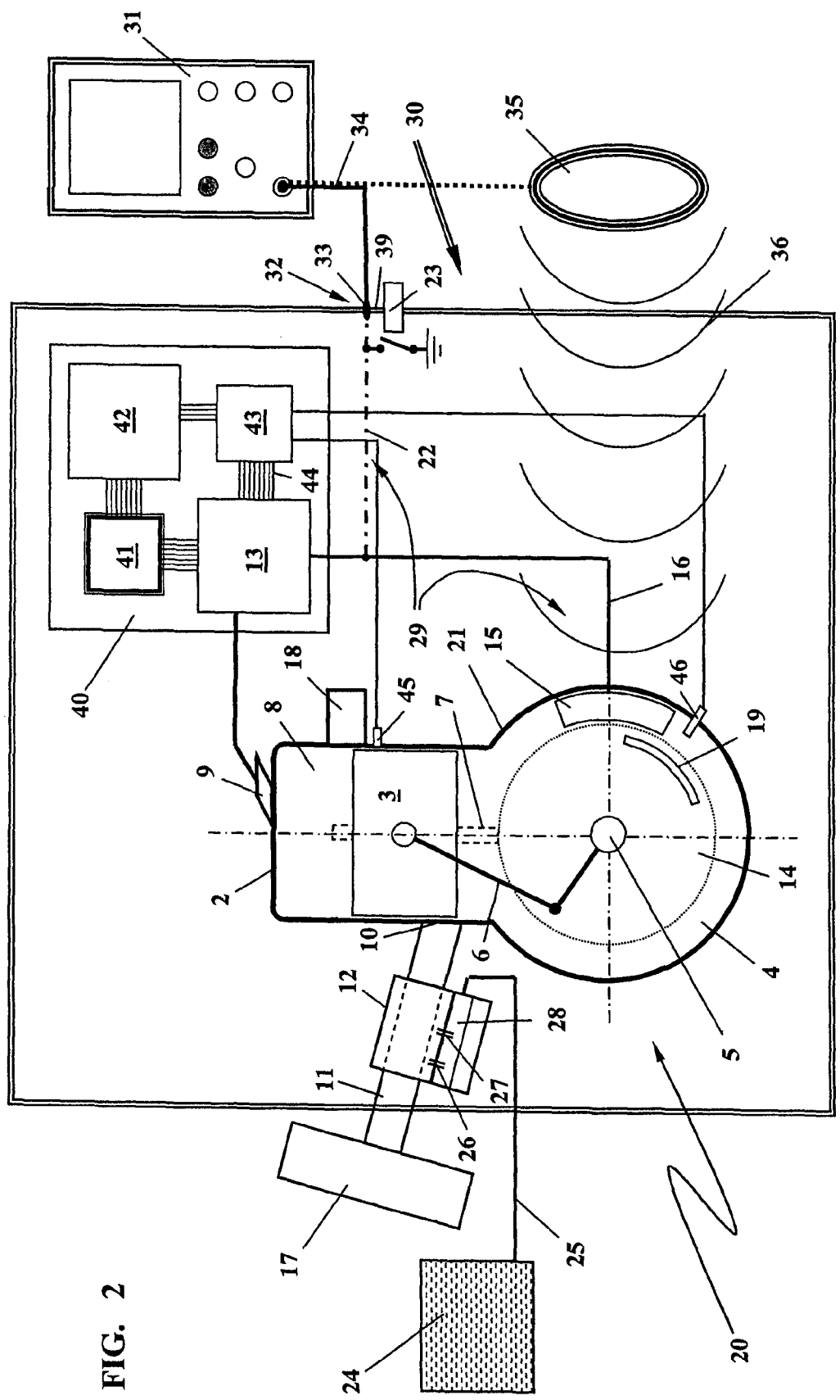
FIG. 2 shows in a schematic illustration a block diagram of the drive unit of the power tool according to FIG. 1 with electronic central control unit arranged therein.

The drive unit 20 is expediently an internal combustion engine 21 as illustrated schematically in FIG. 2. The internal combustion engine 21 in the illustrated embodiment is a single-cylinder two-stroke engine. Other motors are also suitable. The internal combustion engine 21 has preferably a displacement of more than 20 cc (cubic centimeters) and less than 250 cc, in particular less than 150 cc. The internal combustion engine 21 can be embodied as a two-stroke engine, preferably as a two-stroke engine with scavenging air for improving the exhaust gas quality. The internal combustion engine 21 illustrated schematically in FIG. 2 has a cylinder 2 with piston 3 reciprocating therein that drives in rotation a crankshaft 5 supported in the crankcase 4. For this purpose, the crankshaft 5 is connected by an appropriate connecting rod 6 to the piston 3.

The piston 3 controls a mixture intake 10 that takes in combustion air through intake channel 11 and air filter 17 when vacuum is present in the crankcase 4. Fuel is admixed to the combustion air as the combustion air passes through the carburetor 12. The fuel supply can also be realized by means of a fuel valve or injection valve. In the illustrated embodiment, a fuel/air mixture is taken in into the crankcase 4 by means of a mixture intake 10 controlled by the piston 3 and, as the piston moves downwardly, is conveyed by means of transfer passages 7 formed in the cylinder 2 into the combustion chamber 8. By means of ignition control unit 13 a spark is generated at the spark plug 9 which spark ignites the fuel/air mixture compressed in the combustion chamber 8 and, as a result of combustion, the downward movement of the piston 3 drives the crankshaft 5. The exhaust gases produced as a result of combustion are exhausted through the exhaust port 18 that is preferably piston-controlled.

A wheel 14 indicated in dashed lines is connected to the crankshaft 5; the wheel 14 can be in the form of a flywheel, a fan wheel, or a similar rotating part. In the wheel 14 at least one magnet 19 is arranged and induces a voltage in the induction coil 15 that is arranged at the housing circumferentially relative to the wheel 14. The wheel 14 can have several magnets or can be embodied as a magnet ring. The induction coil 15 can be an internally positioned coil as in the case of a generator or can be an external coil like an ignition coil. The output signal of the induction coil 15 is supplied by means of electric signal line 16 to the ignition control unit 13 which is part of a central control unit 40. The generator comprised of the rotating magnet 19 and the induction coil 15 not only provides the ignition energy for the sparks at the spark plug 9 but also the required electric energy for the ignition control unit 13 itself as well as for the central control unit 40 and other consumers, for example, a fuel injection valve or other actuators or sensors.

The fuel that is admixed to the taken-in combustion air is supplied from the fuel tank 24 via fuel line 25 to a diaphragm-controlled control chamber 28 of the diaphragm carburetor 12. The fuel passes from the control chamber 28 by means of main jet 26 or idle jet 27 into the intake passage 11 of the carburetor 12.

The central control unit 40 has a microprocessor 41 that can be utilized also for calculating an adjusted ignition timing or injection timing of an injection valve or other actuators as a function of the detected operating parameters of the internal combustion engine 21. In addition, a data storage device 42 is also controlled by means of microprocessor 41. The data storage device 42 can be used for making available data for the ignition control, for example, for storing characteristic fields of ignition based on which the microprocessor 41, as a function of operating parameters of the internal combustion engine 21, can retrieve the required data for adjusting the ignition timing. The data storage device 42 can also serve as a main memory for the microprocessor 41. According to the invention, the data storage device 42 is provided for saving during operation of the internal combustion 21 the acquired operating parameters in order to retrieve them at any point in time and transfer them to an external receiver 31, for example, during servicing.

For detecting the operating parameters of the internal combustion engine, sensors 45, 46 can be provided, for example a pressure sensor 46 in the crankcase 4 or a temperature sensor 45 in the area of the cylinder 2. The sensors 45 and 46 are connected to an evaluation unit 43 that compares the detected operating parameters with, for example, predetermined limit values and writes the output signals of the sensors into the data storage device 42 any time the predetermined limits are surpassed or the detected value drops below the limit value.

In a preferred embodiment of the invention, the evaluation unit 43 is connected by means of a signal line 44 directly to the output signal of the induction coil 15 wherein algorithms are implemented in the evaluation unit by means of which operating parameters of the internal combustion engine can be derived based on the voltage signal of the induction coil 15. Accordingly, by evaluating the voltage signal not only the engine speed of the internal combustion engine 21 can be determined but, moreover, also the quality of combustion, the angle position of the crankshaft or other parameters typical for operation can be derived. The evaluation unit 43 evaluates the voltage signal of the induction coil 15 and writes the detected evaluation result into the data storage device 42 any time the calculated operating parameter (evaluation result) surpasses or drops below predetermined limit values.

During operation of the internal combustion engine 21, depending on the collected data, atypical operating parameters of the internal combustion engine 21 are also saved within the data storage device 42 and provide a technician with important information when servicing the power tool.

Expediently, the data storage device 42 is designed for saving the operating parameters of the internal combustion engine 21 in such a way that for a full data storage device 42, like a shift register, newest data are written over the oldest data. In this way, in the data storage device 42 always the actual data of a predetermined time frame are saved.

The data storage device 42 is designed moreover such that the data saved therein can be saved without requiring the storage device to be powered, i.e., the data remain in the data storage device 42 and are still accessible when no voltage is present (nonvolatile memory). Such a data storage device can be in the form of an EEPROM, Flash memory, or a similar type of memory.

The data saved within the tool housing 1 in the data storage device 42 are retrieved through interface 30 by means of a receiver 31 positioned outside of the tool housing 1. For transporting the data from the data storage device 42 in the tool housing 1 to the receiver 31 outside of the tool housing 1, a component 29 (FIG. 2) is employed that is required for operation of the drive unit 20; this component is positioned within the tool housing 1.

In a simple configuration, a short-circuit line 22 can be used as an interface 30 which line 22 is a mandatory requirement for such power tools and is used in such tools for shutting off the engine 21. With the short-circuit line 22, by means of a switch or pushbutton 23, the output line 16 of the induction coil 15 is switched to ground so that no voltage is present at the ignition control unit 13 or the central control unit 40 so that these devices cannot operate. Accordingly, the ignition control unit 13 fails and the internal combustion engine 21 stops.

This short-circuit line 22 extends to the outer wall 39 of the tool housing 1 because the operator must operate the short-circuit switch 23 arranged on the outer wall. By means of a mechanical contact 33, the receiver 31 can be connected to the interface 30 wherein the mechanical contact 33 is preferably a plug-in contact 32.

By means of the service line 34 the receiver 31 is connected to the short-circuit line 22 so that the receiver 31 has a direct electrical connection to the central control unit 40. The required control action of the data storage device 42 can be realized by means of this connection, for example, with known bus technology, so that the device 42 will transfer the saved data of the operating parameters through the short-circuit line 22 or new data are written into or a software update is installed in the central control unit 42. The energy for operating the central control unit 40 during read-out can also be supplied via the short-circuit line 22. Operating the internal combustion engine 21 is not necessarily required for reading the operating parameters from the data storage device 42. In particular for diagnostic purposes, it can however be advantageous to read out or write data during operation of the internal combustion engine.

Alternatively, a contactless coupling of the receiver 31 to the data storage device 42 or the central control unit 40 is possible. For this purpose, a sending/receiving coil 31 is connected to the receiver 31; this coil 35 is to be arranged in the area of the induction coil 15 outside of the tool housing 1 in order to communicate by means of induction coil 15 and signal line 16 with the central control unit 40. By means of an alternating electromagnetic field 36 coupling of the data into the component 29 positioned within the tool housing 1, preferably the induction coil, is realized wherein by means of the alternating electromagnetic field 36 the central control unit can also be supplied with the required energy for reading data out of the data storage 42.

In another embodiment of the invention, the central control unit 40 can also release data relating to the ignition coil to the exterior, for example, in the form of defined ignition sequences.

Figure 3:
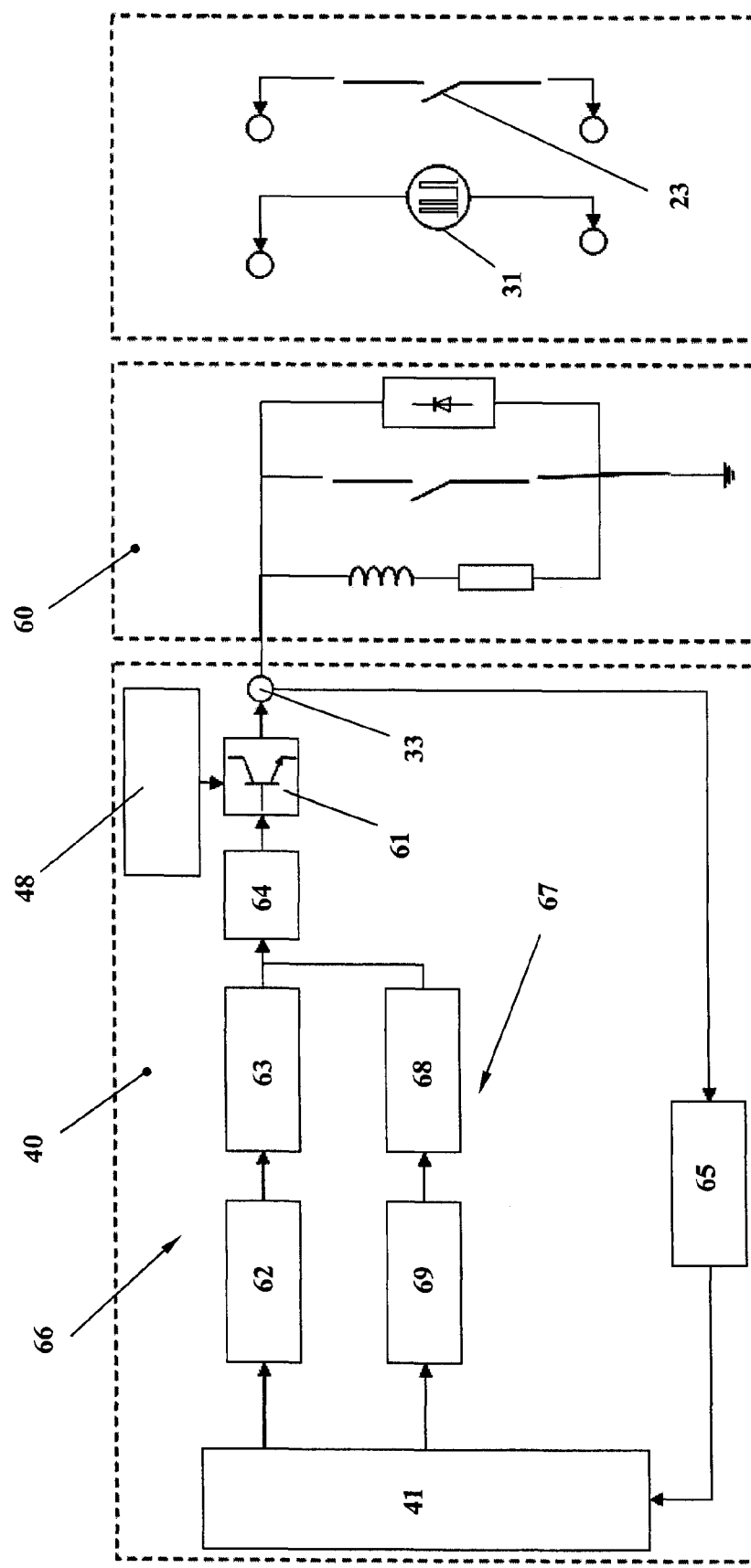
FIG. 3 is a schematic illustration in the form of a block diagram showing an embodiment of the central control unit.

FIG. 3 shows the schematic configuration of a central control unit 40 with control of a load 60, for example, an actuator such as a water valve on a cut-off machine or the like. By means of power switch 61, the supply voltage is supplied to the consumer wherein the power switch 61 is controlled by the microprocessor 41 by means of control components 62 to 64. By means of a voltage stabilizer 65, the microprocessor 41 is supplied with energy. The unit that is illustrated as voltage stabilizer 65 can also be configured for reading or writing signals. Parallel to the control branch 66 there is data branch 67 that is essentially comprised of control component 69 and a shift register 68 whose output is connected to the control branch 66. In this way, at the stop connector 33 (mechanical connector) the energy signals for operating the consumer 60 as well as data signals can be tapped. For this purpose, a corresponding receiver 31 is connected electrically to the stop connector 33, for example, by means of a plug-in contact. Moreover, the short-circuit switch 23 for switching off the internal combustion engine is connected to the stop connector 33 (this is illustrated schematically to the right of FIG. 3).

As illustrated in FIGS. 4 and 5, a data transmission takes place any time the consumer 60 is not supplied with current, i.e., when the consumer 60 is switched off.

The upper curve 70 in FIG. 4 shows the voltage signals at the stop connector 33 when the consumer 60, illustrated as a valve, is switched on. The curve 71 shown underneath illustrates the flow of current. As can be seen, only in the time window $T_{on}$ a signal is present at the stop connector 33. In the time window $T_{off}$ the stop connector is without signal. This feature is used for data transmission.

As shown in the lower part of FIG. 5, in the time window $T_{off}$ data are supplied to the stop connector 33 and are tapped by the receiver 31 and processed in a suitable unit. These data signals 77 are encircled for highlighting purposes by the dashed circle 72. Even though the data signals 77 cause current signals 74, the current signals 74 remain below the triggering threshold 75 of the consumer, in this case a valve, so that no switching process takes place. The consumer is not switched during transmission of data.

The synchronization of the signals at the control branch 66 leading to the stop connector 33 is realized by signal control unit 69 that emits data signals through the shift register 68 to the control branch 66 exclusively when the consumer 60 is switched off.

With this technology, the existing stop connector 33 can be used also as a data line wherein not only data from the central control unit 40 are received but also data can be transmitted to the unit 40.

In the embodiment according to FIGS. 6 and 7, a data transmission is carried out also during operation of the consumer, i.e., when the consumer 60 is switched on. Like FIG. 4, FIG. 6 shows the voltage curve 70 and the current curve 71 with the consumer being switched on. In order to realize data information with switched-on consumer, the voltage signals 70 are modulated. As shown in FIG. 7, the voltage signals 70 are amplitude-modulated. The receiver 31 demodulates the tapped signals and gains in this way the transmitted data. Even though the amplitude modulation causes a change of the current, this change is only minimal and has no effect on the switching state of the consumer, for example, a valve.

In a corresponding way, the data transmission can also be realized by frequency modulation of the voltage signal as illustrated in FIGS. 8 and 9. FIG. 8 shows the voltage curve 70 and the current curve 71 with consumer being switched on. In order to transmit data information with the consumer being switched on, the voltage signals of the curve 70 are modulated. FIG. 9 shows a frequency modulated voltage curve 70$b$ that has changing frequencies $f_1$ and $f_2$ across the time axis. By means of frequency modulation data are transmitted that are filtered in the receiver 31 by demodulation. By means of frequency modulation the current curve 71b is changed but this has no effect on the switching position of, for example, a controlled valve.

The start of data transmission can be realized by means of an externally generated start signal, for example, by means of a voltage imprinted from the exterior onto the inner voltage signal. This imprinted voltage is recognized by the ignition unit and data transmission is started.

In this way, it is also possible to input data from the exterior into the central control unit 40. By means of a quick switch 23 a switched load can be switched on and off. Also, a modulation of the load resistance for data transmission would be advantageous.

FIGS. 10 and 11 show an illustration of a signal sequence with voltage $\Delta U_i$ that is imprinted from the exterior at the stop connector 33. FIG. 10 shows the voltage curve 70 and the current curve 71 with switched-on consumer without data transmission, i.e., without imprinted voltage. In order to transmit data information from a service tool from the exterior to the interior with the consumer being switched on, a voltage $\Delta U_i$ is imprinted from the exterior, for example. This voltage $\Delta U_i$ changes the individual voltage signals by $\Delta U_i$ ($\Delta U_1$ and $\Delta U_2$) so that data can be transmitted from the contact 33 to the central control unit 40. In this way, a voltage curve 70c results that causes a current curve 71c. The imprinted voltage $\Delta U_i$ does not cause any state changes at the consumer, for example, a switching valve.

The above described methods and the methods illustrated in FIGS. 5, 7, 9, and 11 can be expediently combined with one another so that, for example, a data transmission can be performed during a time when the consumer is switched on as well as during a time when the consumer is switched off. A time-shifted writing and retrieving of data is thus possible.

With the method according to the invention it is possible to carry out a data exchange as the engine is running without the function of the individual components, e.g. a fuel valve or another type of valve, being impaired. The power tool is fully functional while data is being transferred from the power tool to the exterior or from the exterior into the power tool. The data transfer does not interrupt the function of the power tool in any load situation. This data transfer while the engine is running is illustrated, for example, in FIG. 4. A data transfer is performed during operation of the power tool any time the consumer itself, e.g. the valve, does not receive a signal so that the line can be used for data transfer. The valve can be used despite data transfer without any impairment.

The specification incorporates by reference the entire disclosure of German priority document 10 2006 038 278.1 having a filing date of 16 Aug. 2006.

While specific embodiments of the invention have been shown and described in detail to illustrate the inventive principles, it will be understood that the invention may be embodied otherwise without departing from such principles.

What is claimed is:

1. A power tool comprising:
   a tool housing;
   a drive unit arranged in the tool housing and comprising an internal combustion engine that comprises a cylinder with a combustion chamber, a spark plug arranged at the cylinder, a piston connected to a crankshaft and reciprocatingly arranged within the cylinder and delimiting the combustion chamber;
   a central control unit controlling the drive unit and comprising a microprocessor and an ignition control unit, wherein the central control unit is connected by the ignition control unit to the spark plug and triggers a spark at the spark plug as a function of a rotary speed of the crankshaft at an appropriate ignition timing;
   a data storage device connected to the central control unit;
   an energy supply unit providing electric energy;
   an interface enabling, from outside the tool housing, external data access to data of the central control unit.

2. The power tool according to claim 1, wherein the external data access is bidirectional.

3. The power tool according to claim 1, wherein data saved in the data storage device are retrievable via the interface.

4. The power tool according to claim 1, wherein operating data of the internal combustion engine determined in operation of the internal combustion engine are input into the data storage device and saved in the data storage device and wherein the data in the data storage device are stored in a powerless state of the data storage device.

5. The power tool according to claim 1, wherein the interface is a component of the power tool that is required for operation of the drive unit and is located within the tool housing.

6. The power tool according to claim 1, wherein the interface is a short-circuit line of an ignition of the drive unit.

7. The power tool according to claim 1, wherein the interface is an electric line connecting a generator of the energy supply unit to the central control unit.

8. The power tool according to claim 1, wherein the interface is an electric line connecting a generator of the energy supply unit to the data storage unit device.

9. The power tool according to claim 1, comprising a receiver located external to the tool housing wherein the external data access is initiated by the receiver.

10. The power tool according to claim 9, comprising a mechanical contact wherein the receiver is connected to the interface by the mechanical contact.

11. The power tool according to claim 9, wherein the mechanical contact is a plug-in contact.

12. The power tool according to claim 9, wherein the receiver is coupled to the interface without mechanical contact.

13. The power tool according to claim 12, wherein the receiver is coupled by an alternating electromagnetic field to the interface.

14. The power tool according to claim 13, wherein the interface is coupled by an induction coil of a generator of the energy supply device to the alternating electromagnetic field of the receiver.

15. The power tool according to claim 13, wherein the interface is coupled by a high-voltage coil of an ignition of the drive unit to the alternating electromagnetic field of the receiver.

16. The power tool according to claim 1, wherein the central control unit comprises an evaluation unit, wherein a voltage signal of a generator of the energy supply unit is supplied to the evaluation unit, and wherein the evaluation unit provides a result that is saved in the data storage device.

17. The power tool according to claim 16, wherein the result is saved in the data storage device when the result surpasses or drops below a predetermined limit value.

18. The power tool according to claim 1, wherein the internal combustion engine is a single-cylinder engine.

19. The power tool according to claim 1, wherein the internal combustion engine has a displacement between approximately 20 cc and approximately 250 cc.

20. The power tool according to claim 18, wherein the displacement of the internal combustion engine is approximately 150 cc.

21. The power tool according to claim 1, wherein in operation of the internal combustion engine a signal transmission is realized in signal pauses of signals occurring in operation of the internal combustion engine.

22. The power tool according to claim 1, wherein in operation of the internal combustion engine a signal transmission is realized by modulation of signals occurring in operation of the internal combustion engine.

23. The power tool according to claim 1, wherein a signal transmission is realized by cyclical switching of an external load.

24. The power tool according to claim 1, wherein energy is transmitted by an alternating field to a generator coil of the energy supply unit or an ignition coil of an ignition of the internal combustion engine.

25. The power tool according to claim 1, wherein data are transmitted by an alternating field to a generator coil of the energy supply unit or an ignition coil of an ignition of the internal combustion engine.

26. The power tool according to claim 1, wherein energy and data are transmitted by an alternating field to a generator coil of the energy supply unit or an ignition coil of an ignition of the internal combustion engine.

* * * * *